United States Patent [19]

Berry et al.

[11] Patent Number: 4,866,700
[45] Date of Patent: Sep. 12, 1989

[54] DIGITAL SWITCHING SYSTEM

[75] Inventors: Georges Berry, Franconville; Jean-Paul Woillez, Epinay sur seine; Hervé Lohier, Paris, all of France

[73] Assignee: Thomson-CSF, Paris, France

[21] Appl. No.: 192,527

[22] Filed: May 11, 1988

[30] Foreign Application Priority Data

May 15, 1987 [FR] France .................. 87 06845

[51] Int. Cl.$^4$ ............................. H04Q 11/04
[52] U.S. Cl. .................. 370/58.1; 379/279; 379/278
[58] Field of Search .............. 370/58, 65, 67, 13, 370/16; 379/278, 279, 15

[56] References Cited

U.S. PATENT DOCUMENTS

| | | | |
|---|---|---|---|
| 3,760,103 | 9/1973 | Condon | 370/65 |
| 4,228,536 | 10/1980 | Gueldenpfennig . | |
| 4,566,094 | 1/1986 | Ardon et al. | 370/58 |
| 4,583,218 | 4/1986 | Ardon et al. | 370/58 |
| 4,763,316 | 8/1988 | Schaich et al. | 370/16 |

FOREIGN PATENT DOCUMENTS

| | | | |
|---|---|---|---|
| 0185936 | 11/1985 | European Pat. Off. . | |
| 3328405 | 2/1985 | Fed. Rep. of Germany . | |
| 0123013 | 10/1978 | Japan | 370/58 |
| 8505241 | 11/1985 | World Int. Prop. O. . | |

OTHER PUBLICATIONS

J. Terry et al., "DMS-200 Traffic Peripherals", ICC '78, Jun. 1978, pp. 32.3.1–32.3.6.
Proceedings of the International Switching Symposium, Florence, 7–11 mai 1984, partie 1, "session 23", "paper 5", pages 1–5, North Holland, Amsterdam, NL; K. -E. Huhn et al.: "System architecture of a future oriented complete digital PABX family".

*Primary Examiner*—Robert L. Griffin
*Assistant Examiner*—Wellington Chin
*Attorney, Agent, or Firm*—Oblon, Spivak, McClelland, Maier & Neustadt

[57] ABSTRACT

A digital switching system for establishing safety communications between N junctors is intended to guard against the potential danger of generalized failure which lies in the use of a central control unit and digital connection network for carrying out exchanges of information between junctors. Accordingly, each junctor is directly coupled to the N-1 other junctors of the system and is provided with its own control unit and its own digital connection network in order to enable said junctor itself to select the particular information which it is desired to receive from the N-1 other junctors. This system is primarily applicable to air and ocean traffic control.

5 Claims, 3 Drawing Sheets

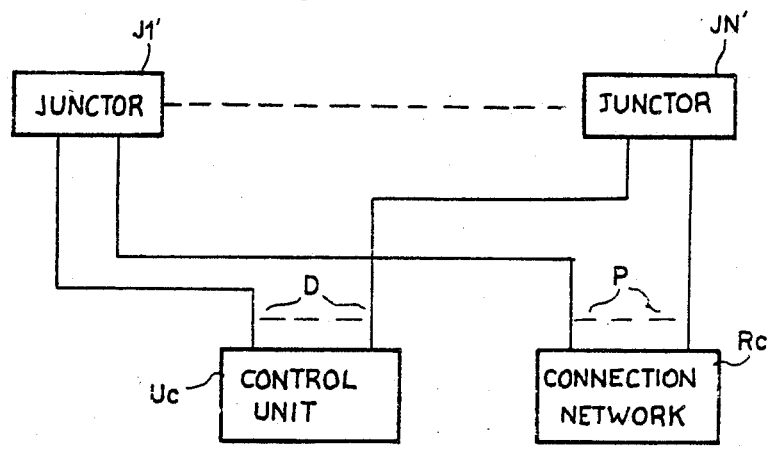
FIG_1
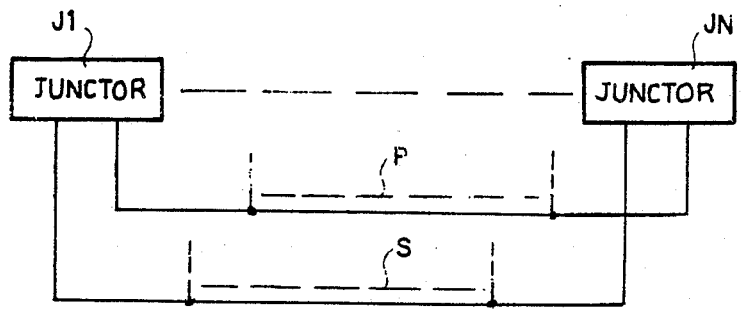
FIG_2

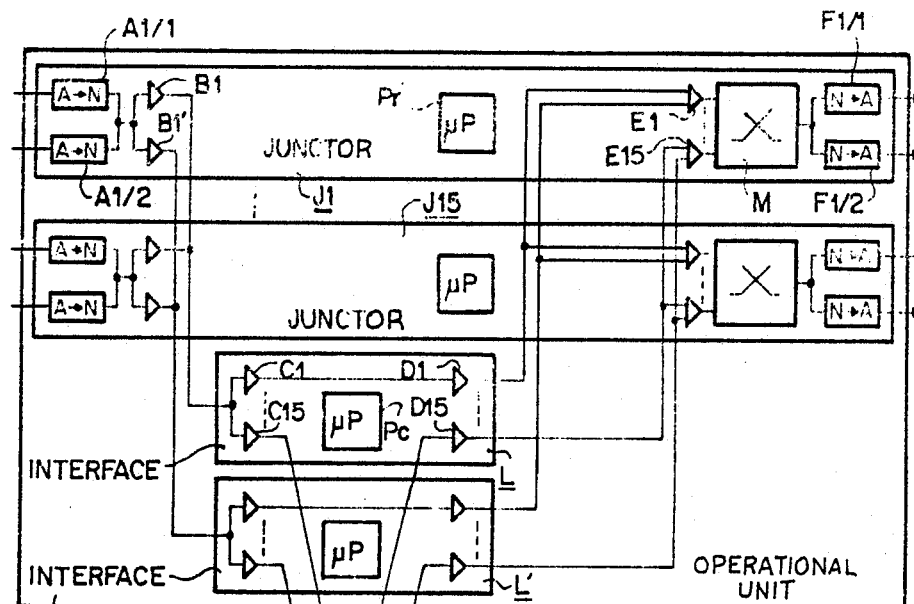
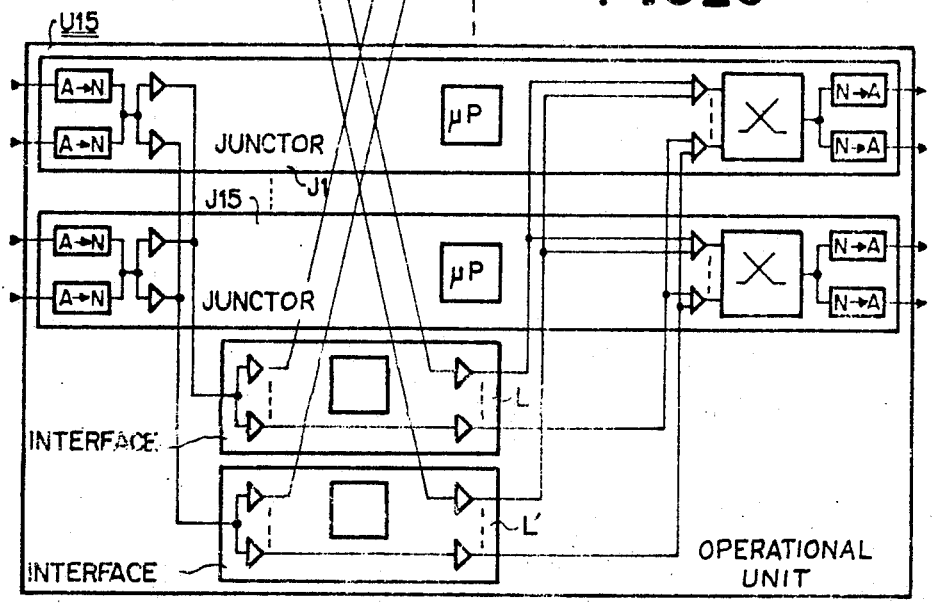
FIG_3
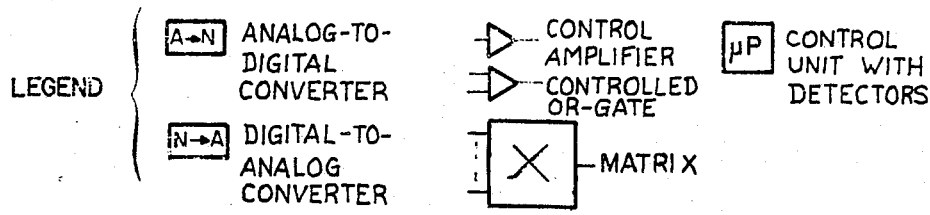

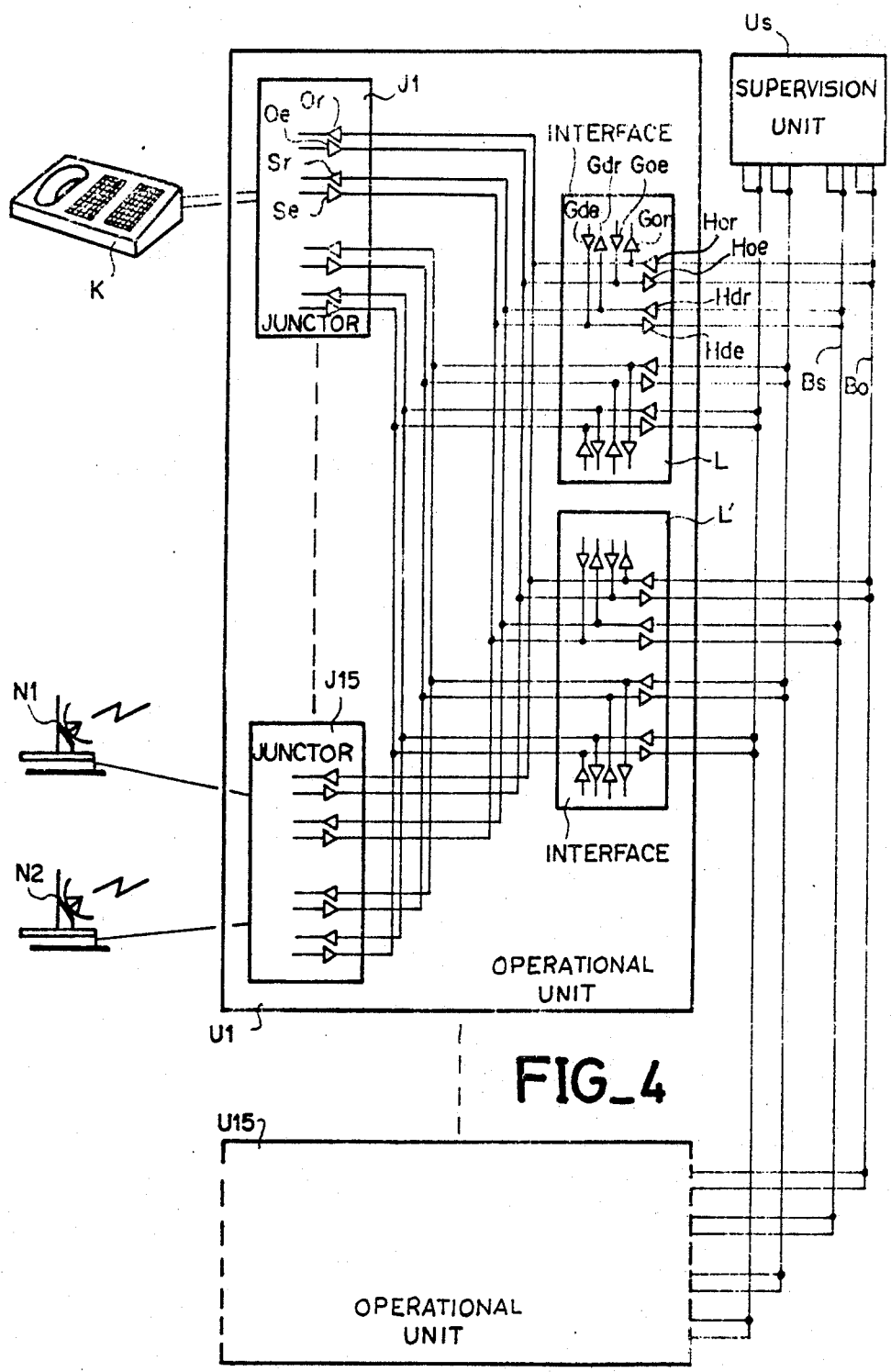
FIG_4

DIGITAL SWITCHING SYSTEM

BACKGROUND OF THE INVENTION

The present invention relates to a system for digital switching between n junctors (n being a whole number greater than 1) and more particularly to a digital switching system for use in the field of safety communications such as air and ocean traffic control. In a digital switching system, the junctor serves as an interface for operator stations, different radio channels, telephone lines, and so forth.

Systems of this type are already known in which all the junctors are connected to a central control unit and to a central connection network which are associated for receiving information from the different junctors of the system and controlling the junctor interconnections. As a result of the highly centralized structural arrangement of these switching systems, the complex assembly constituted by the central control unit and the central switching network are liable to result in total paralysis of the system whenever a failure occurs.

SUMMARY OF THE INVENTION

The object of the present invention is to prevent or at least considerably reduce the risk of total paralysis.

This object is achieved by means of a switching system having a highly decentralized structure both in equipment and in logic circuitry, in which each junctor has its own control unit and its own switching network.

According to the present invention there is provided a system for digital switching between n junctors (n being a whole number greater than 1) which deliver speech and signaling information, said system being provided with direct connections between the junctors so as to ensure that each junctor is capable of directly exchanging its information with the (n−1) other junctors and each junctor being provided with its own decision and switching unit formed by a control unit with fault detectors and by a digital connection network controlled by the aforesaid control unit.

BRIEF DESCRIPTION OF THE DRAWINGS

FIG. 1 illustrates a digital switching system in accordance with the prior art.

FIG. 2 illustrates a digital switching system in accordance with the invention.

FIGS. 3 and 4 are more detailed views of portions of the system shown in FIG. 2.

In the different figures, the synchronization devices relating to current technology have not been illustrated for the sake of enhanced clarity of the drawings and simplicity of the description.

DETAILED DESCRIPTION OF THE INVENTION

FIG. 1 is a schematic view showing a switching system in accordance with the prior art. This system comprises n junctors J1' to JN' for delivering information D on the state of the junctors and digitized speech information P. The information D relating to the state of the junctors is transmitted without being processed to a control unit Uc derived from a computer which processes the information received and delivers output signals for controlling the state of the junctors. The speech information P of a junctor is transmitted to a connection network Rc having a space-time distribution matrix for carrying out under the control of the control unit Uc multiplexing of the speech information and retransmission of this information to the junctors. Communication between two junctors is established by the central unit which determines within the junctors the choice to be made in received speech information. In order to improve operational safety of a switching system of this type, it is a known practice to duplicate the outputs of the junctors and to duplicate the control unit Uc and the connection network. But in spite of the extensive equipment employed as well as the complexity of the control unit and connection network, there is a potential danger of total failure of the system as a result of failure of both control units or both control networks, thus leading to a major operational safety hazard.

FIG. 2 shows how this risk of total failure may be reduced. FIG. 2 illustrates n junctors J1 to JN which are distinguished from the junctors J1' to JN' of FIG. 1 by the fact that they each have their control unit and their connection network. The junctors J1 to JN can thus directly exchange digitized speech information P and signaling information S between each other or in other words information on the state of the junctors after such information has been processed by the control units relating to said junctors. Both in this specification and in the appended claims, direct exchange of information between the junctors is understood to mean a dialog between junctors in which the information delivered by one junctor is received unchanged by another junctor, that is to say without having been processed by means other than amplifiers. Thus a failure of the control unit or of the connection network of one junctor affects this junctor alone and the dialog may be continued between the other junctors.

FIGS. 1 and 2 are highly simplified diagrams which show neither the duplication of certain elements and certain connections nor the duplicated clock which delivers the time-base signals. Similarly, FIG. 2 shows neither the interfaces placed between the junctors nor the supervision unit which collects information on the state of the system and the function of which is to facilitate maintenance. It is in any case worthy of note that these interfaces are transparent to the signals and that the supervision unit could if necessary be dispensed with except for the clock which it contains.

The concrete example described hereinafter relates to a digital switching system involving the use of digital junctors each provided with their control unit having a microprocessor base and their digital switching network. The junctors of the system each have two speech channels and are of three types: a junctor for an operator station which interfaces an operator station with two speech channels (one radio channel and one telephone channel), a telephone junctor employed for management of two telephone lines and a radio junctor for management of two radio channels. Apart from their control unit and their switching channel which are in any case of simpler design than the corresponding control unit and switching network of the prior art (shown in FIG. 1), the construction of these junctors is based on current practice in communications and will therefore not be described in order to avoid explanations which would overburden the description without being conducive to a clear understanding of the invention. Another point to be noted is that, since the signals exchanged between them are similar in the case of all three types of junctor, it will not be specified whether a junctor considered is of the operator station type, of the telephone type or of the radio type.

Generally speaking, in the description of the specific construction which is considered by way of example, circuits within the capacity of those versed in the art and especially circuits which are more simple than in the prior art will not be discussed in detail for the sake of enhanced simplicity of the description.

The example described hereinafter relates to a system formed by operational units of fifteen junctors each provided with their supply. This system can have up to fifteen operational units which therefore represent $15 \times 15 = 225$ junctors or in other words can have a maximum capacity of $2 \times 225 = 450$ channels.

FIG. 3 shows in the case of a maximum capacity the arrangement adopted for wiring the speech multiplexing portion of the digital switching system considered by way of example. Only the first unit U1 and the fifteenth unit U15 of the fifteen operational units have been illustrated. In these operational units, only the first and fifteenth junctor out of the fifteen which constitute the unit are illustrated. These junctors are designated by the references J1 to J15 in all the operational units and therefore require that the operational unit to which they belong should be indicated in order to be designated with precision. Apart from the fifteen junctors, each operational unit has two interfaces designated by the references L and L' in all the units. In order to designate them with precision, the unit to which they belong must accordingly be indicated.

In order to simplify the writing and utilization of references, only the elements shown within the junctor J1 and the interface L of the operational unit U1 have been indicated. Subject to differences which do not appear in FIG. 3 and which are due to the type of channel to be switched, the other junctors and the other interfaces have the same elements respectively as said junctor J1 and said interface L. Thus an element without any reference may accordingly be designated hereinafter by the reference of the corresponding element in J1 or L of U1 followed by the reference of the junctor or of the interface to which it belongs as well as that of the operational unit in which it is located.

On the left-hand side of FIG. 3 are indicated the transmission accesses, namely two per junctor and corresponding to the two speech channels of each junctor. In the right-hand portion of FIG. 3 are indicated the reception accesses of the junctors corresponding to the two channels which each junctor is capable of selecting from the $2 \times 15 \times 15 = 450$ channels referred-to earlier.

The two transmission accesses of a junctor correspond respectively to the inputs of two analog-to-digital converters A1/1, A1/2 which each create a digital time interval, this time interval being in most instances hereinafter denoted I.T. for the sake of conciseness. These two I.T's are therefore the images of the two channels specific to the junctor. By virtue of the duplicated time base specific to the system, thirty different time pulses are assigned to the $2 \times 15 = 30$ I.T. of each operational unit by the analog-to-digital converters. At the outputs of the two converters A1/1, A1/2, the two I.T's are transmitted to the same conductor and applied to the inputs of two controlled amplifiers B1 and B1' in order to be duplicated accordingly.

The outputs of the amplifiers B1 and those of the amplifiers B1' of the fifteen junctors of an operational unit are connected respectively to the input of the interface L and to the input of the interface L'. In consequence, these two interfaces each receive the 30 I.T's relating to the thirty transmission accesses. Each interface has fifteen input amplifiers C1 to C15 and fifteen output amplifiers D1 to D15. The outputs of the amplifiers C1 to C15 of the interface L of the unit U1 are connected respectively to the input of the amplifier D1 of the interface of the unit U1, to the input of the amplifier D1 of L of U2 (not shown) and so on in sequence up to the input of the amplifier D1 of L of U15. The same connections exist between the amplifiers C1 to C15 of the interface L' and the inputs of the amplifiers D1 of L' of U1, D1 of L' of U2, . . . , D1 of L' of U15. Similar connections serve to couple the input amplifiers C1 to C15 of the interfaces L and L' of the operational units U2 to U15 to the output amplifiers D1 to D15 of the interfaces L and L' of the units U1 to U15. Thus the outputs of the amplifiers C1 to C15 of L' of U15 are connected respectively to the input of the amplifier D15 of L' of U1, D15 of L' of U2, . . . , D15 of L' of U15.

In each operational unit, the outputs of the amplifiers D1 to D15 of L and of L' therefore deliver respectively in duplicate the thirty I.T's of the units U1 to U15. Each of the fifteen junctors of each of the fifteen units has its own digital connection network constituted by a space-time matrix M having fifteen accesses which are respectively coupled to the outputs of fifteen controlled OR-gates E1 to E15. These OR-gates have two inputs and these inputs are connected in the case of the gate E1 to the outputs of D1 of L and L', . . . , and in the case of the gate D15 to the outputs D15 of L and L'. Thus each matrix M receives from the OR-gates D1 to D15 the 450 I.T's corresponding to the 450 speech channels of the system and is capable of selecting any two of these latter in order to deliver them on its output.

As shown in FIG. 3, each junctor has its own control unit based on a microcomputer and detectors as designated by the reference Pr in the junctor J1 of the operational unit U1. Each interface also has its own control unit based on a microcomputer and detectors as designated by the reference Pc within the interface L of the operational unit U1. It is the control unit Pr of the junctor which, as a function of the state of the system and of the two channels to be received in the junctor considered, determines in the case of each OR-gate E1 to E15 of the junctor which of the two duplicated inputs of this gate is to be connected to the matrix M of the junctor. The two time intervals thus selected are processed respectively in two digital-to-analog converters F1/1, F1/2 which each select one of the two I.T's by means of a time pulse delivered by the time base of the system and under the control of the control unit which is specific to the junctor considered. The output of the converters F1/1, F1/2 restitutes in analog form the signal of the selected speech channel.

Again in the case of the example which we have begun to describe with reference to FIG. 3, FIG. 4 shows the wiring arrangement relating to the local signaling network of the system which permits a dialog between the different control units of the system by exchange between the different junctors and interfaces of the system and a supervision unit Us mentioned earlier, of information on the state of the different junctors and of the different interfaces. Each junctor and each interface delivers the information on its state after having processed this information in its own control unit as shown in FIG. 3 but not reproduced in FIG. 4.

As in the case of the speech multiplexing wiring system, the local signaling network is duplicated in a first network and a second network which are identical, thus making it necessary to describe only one of these networks hereinafter. For the sake of enhanced clarity and simplicity, only those elements which need to be designated individually are given a reference in FIG. 4. Moreover, as in the case of FIG. 3, the 15×15=225 junctors of the system do not exhibit any differences and the same applies to the 15×2=30 interfaces, at least in regard to the local signaling network, all that will be said in connection with the junctor J1 and the interface L of the operational unit U1 will apply respectively to the other junctors and to the other interfaces.

FIG. 4 shows the operational unit U1 with the interfaces L, L' and the junctors J1, J15 with an operator station K which employs the two speech channels of the junctor J1 and two radio assemblies N1, N2 which employ respectively the two speech channels of the junctor J15. FIG. 4 also shows the operational unit U15 and the supervision unit Us.

The first local signaling network has a bus topology and has two lines: a data line Bs and an occupation line Bo which indicates whether the local network is utilized or not, thus making it possible to limit the risk of simultaneous presence of data having different origins on the line Bs. When a junctor is required to transmit a message, it must therefore wait until the occupation line Bo is free. The lines Bs and Bo are connected in identical manner to the fifteen operational units U1 to U15 and to the supervision unit.

The junctor J1 is connected by two lines to the line Bs and by two lines to the line Bo: a data transmission line with a controlled amplifier Fe, a data reception line with a controlled amplifier Sr, a transmission occupation line with a controlled amplifier Oe and a reception occupation line with a controlled amplifier Or. These lines, at the output of the junctor J1, are common to the fourteen other junctors of the operational unit. The lines related to the amplifiers Se, Sr, Oe, Or traverse the interface L respectively through four controlled amplifiers Hde, Hdr, Hoe and Hor in order to be connected to the data line Bs in the case of the first two and to the occupation line Bo in the case of the other two. In the interface L, four lines equipped with four operational amplifiers Gde, Gdr, Goe, Gor are shunt-connected respectively to the lines equipped with amplifiers Hde, Hdr, Hoe, Hor.

The control unit of the junctor J1 is provided with fault detectors which serve to changeover to the other network if a fault or failure is detected on one of the two duplicated networks and to isolate the junctor from the remainder of the system in the event of a fault condition. Changeover from one network to another or isolation of the junctor are performed by control of the OR-gates E1 to E15 (FIG. 3) and by blocking of the controlled amplifiers of the junctor, namely the amplifiers B1, B1' of FIG. 3 and the amplifiers Se, Sr, Oe, Or of FIG. 4. In the event that a short-circuit appears at the output of an amplifier, the control unit of the junctor cannot inhibit this latter, in which case the interfaces L, L' of the operational unit intervene. Their control unit Pc (FIG. 3) is provided with detectors for detecting faults in the messages. These detectors serve to determine whether the messages obtained from the fifteen junctors of the operational unit are all coherent and, should this not be the case, to block the amplifiers Hde, Hdr, Hoe and Hor (FIG. 4).

As will be noted with reference to FIG. 4, it is in order to ensure a higher degree of reliability and easier fault location of the signaling networks that each interface L, L' ensures isolation and separation into a transmission bus and into a reception bus within the operational unit with respect to a single transmission-reception bus between the different units for exchanges of signaling information.

It is also worthy of note that the time-base signals delivered by the supervision unit Us to each junctor in a duplicated manner through the interfaces are controlled by detectors at the level of the interfaces and of the junctors. Again by virtue of the control units of the junctors and interfaces, this makes it possible to operate a junctor with either of the two time-base signal distributions when they are both in a normal state but to choose automatically the better of the two distributions when a fault condition has been found in the other.

The present invention is not limited to the example hereinbefore described. From this it follows in particular that the number of junctors per operational unit may be different from fifteen and may even be reduced to one. Similarly, the number of operational units of a digital communication system can be different from fifteen and may be reduced to one if necessary. As has already been mentioned, the supervision unit may be reduced to a time-base circuit and therefore may no longer have a supervision function but simply a synchronization function. Similarly, the interfaces can be replaced by simple conductive connections without controlled amplifiers and without a control unit with detectors although it will be understood that, all other things being equal, operational safety will be distinctly lower than that of the system described with reference to FIGS. 3 and 4.

What is claimed is:

1. A system for digital switching between n junctors, n being a whole number greater than 1, which receive and deliver speech and signaling data, said system being provided with direct connections between the junctors so as to ensure that each of the n junctors is capable of directly exchanging data with the other junctors of the n junctors, wherein each of the n junctors is provided with its own decision and switching unit to manage exchanges of the data with the n−1 other junctors, formed by a control unit with fault detectors and by a digital connection network controlled by the aforesaid control unit.

2. A digital switching system according to claim 1, wherein all the connections between the junctors are duplicated into two sets of connections and wherein the control unit of each of the n junctors is so designed as to choose automatically the one of the two sets of connections through which transmission of information is correct when transmission through the other one of the two sets of connections is not correct, the choice being made as a function of the signaling data receiving by the junctor and of fault information detected by the control unit in the junctor.

3. A digital switching system according to claim 1 in which n is at least equal to 4, wherein the junctors are regrouped in m, m being a whole number greater than 1, separate and distinct operational units, each operational unit comprising at least two of the n junctors and at least one interface which is transparent to information n order to carry out exchange of information between the junctors of the operational unit and the interfaces of the other of the m operational units and wherein each interface of the m operational units has a control unit with a detector for coherence of information in order to enable the interface to inhibit transmission of information which is judged to be incoherent.

4. A digital switching system according to claim 3 and comprising within each of the m operational units two identical interfaces having the function in each case of exchanging data between the junctors of the operational unit and the other of the n junctors of the system, wherein the connections between junctors relating to exchanges of the signaling data when they pass through one of the interfaces are duplicated and ensure by means of amplifiers a separation into a transmission bus and a reception bus within the operational unit and into a single transmission-reception bus between the different operational units.

5. A digital switching system according to claim 1, wherein each of the connections relating to exchanges of signaling data comprises two conductors, namely a first conductor for transferring data proper and a second conductor on which an occupation signal is transmitted by the junctor which transmits on the first conductor.

* * * * *